Patented May 22, 1951

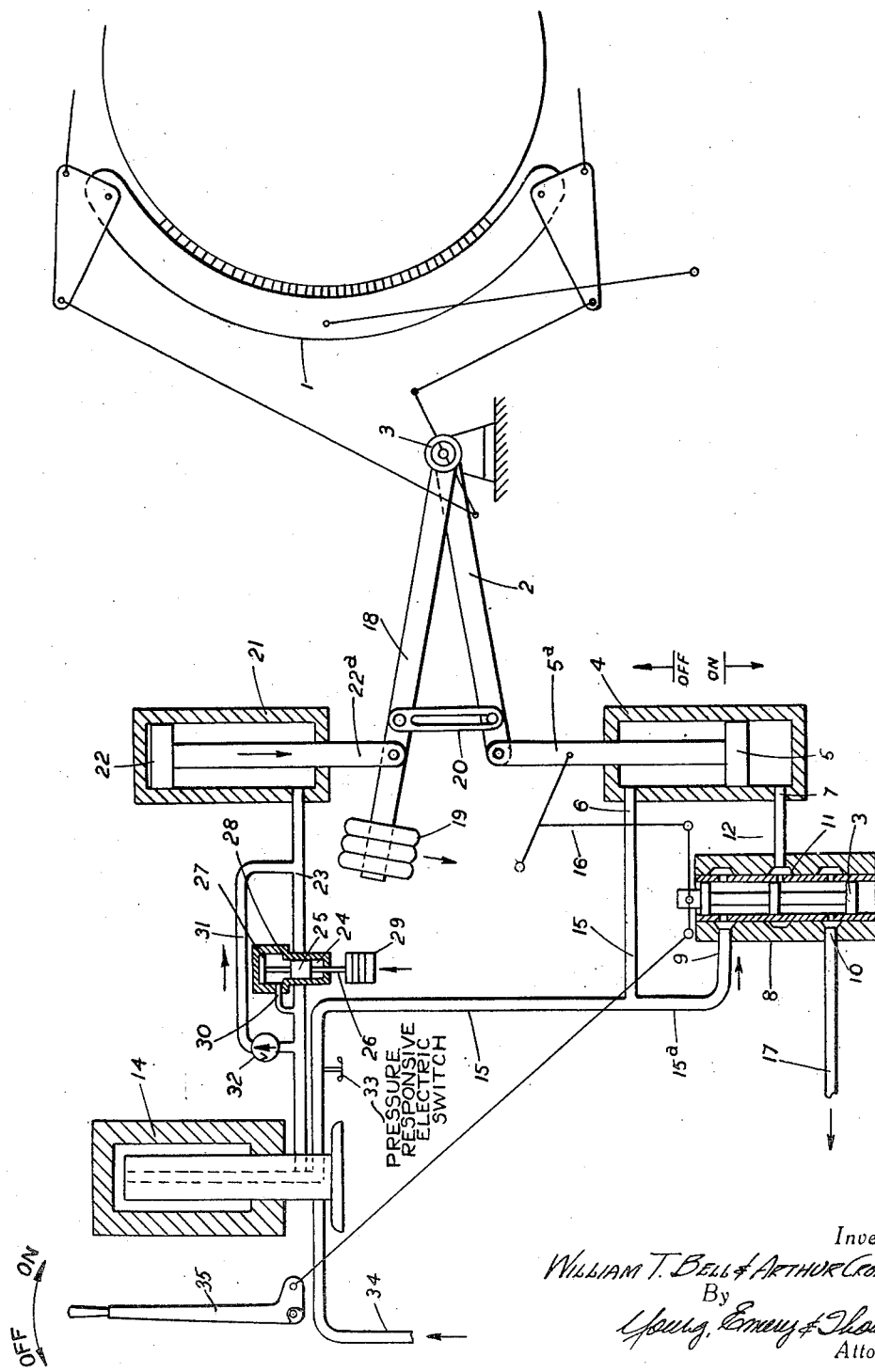

2,554,235

UNITED STATES PATENT OFFICE 2,554,235

FLUID PRESSURE BRAKE WITH EMERGENCY WEIGHT OPERATOR

William Thomas Bell and Arthur Crompton, Lincoln, England

Application July 11, 1947, Serial No. 760,352
In Great Britain June 3, 1940

Section 1, Public Law 690, August 8, 1946
Patent expires June 3, 1960

2 Claims. (Cl. 121—41)

This invention relates to mechanical brake systems of hoisting engines, haulages, and other machines having rotating members.

It has been recognised for some time that the brakes used for winding engines and haulages have serious defects in the method of operation. The usual British practice is to employ either one or two pairs of brakes which are forced into contact with braking surfaces attached to the side of the winding drum or drums by weights on the brake lever. The brake lever is connected with the brake actuating piston, the movement of which is controlled by the driver's operating lever. Normally the brakes are held "on" by the weights, and to take the brakes "off," the brake lever and weights are raised by pressure being applied under the brake actuating piston, the medium for which pressure may be steam, compressed air or oil.

The application of the brakes to control the speed of the winding drum and to bring it to rest requires the raising and lowering of the weights. When the brake actuating piston is operated the considerable inertia effect of the weights, with the consequential rebound, does not permit smooth action of application of the brakes, nor sensitive control on the speed of the winding drum.

The rapid application of the brakes by means of the falling weights, which are suddenly arrested in their movement, transmits serious shocks to the braking system, the winding ropes and to any men who may be riding in the conveyances. Various means are adopted to restrict the rate of application of the brakes to reduce the inertia effect of the falling weights, for instance, it has been proposed to provide a fluid-pressure inter-connected means between the weights and the brake operating lever, so that when the brake weights are released the pressure set up in the fluid by the weights is used to operate the brake lever, a valve being interposed in the fluid system between the weights and the brake operating lever which may be used in conjunction with an adjustable throttling valve so that by decreasing or increasing the valve opening the pressure of the fluid itself can be altered, hence altering the pressure on the brake system.

The latest British mining regulations require safety protection devices to be fitted to hoisting engines to limit the speed of approach to the permanent landing at the bottom of the shaft when hoisting men. The emergency operation of such protective devices requires the brakes to be applied very rapidly, and it is found in some cases that the orthodox weight applied brakes cannot meet the requirements, although the weights are permitted to fall without restriction.

To obtain quicker operation some braking systems incorporate springs to assist the falling weights, whilst others have a pressure supply combined with the falling weights to obtain the necessary speed of application. In both cases the inertia of the weights is still present to some extent, and failure of the springs due to fatigue or breakage, or failure of the pressure supply, would again impose the full effect of the falling weights on the system.

Large proportions of the accidents with winding machinery are due to the operator inadvertently applying power in the wrong direction when approaching the limits of the wind. The protecting gear, therefore, to be effective, requires very quick acting brakes, and the brake system should be as free from inertia as possible.

The object of the present invention is to eliminate the use of falling weights, a combination of weights and springs, or a combination of weights with a pressure medium to normally effect the braking, and to provide a positive power operated brake system with a maximum speed of application, thus eliminating the objections and limitations above described, and to provide a safe operating system in any circumstances.

According to this invention, the brake lever, without weights, is connected to the movable member of a double-acting pressure operated device, such as a brake cylinder, the device on one side of the movable member being connected directly to a pressure medium supply, and on the other side through a control valve to the pressure medium supply, in such a manner that a constant pressure in the direction of brakes "on" is applied directly to the movable member, and pressure can be admitted through the control valve to the other side of the movable member to overcome the constant pressure in order to move the brakes to the "off" position, means being also provided to cause the brakes to be applied if any failure or loss of the pressure takes place.

The invention can be carried into effect in various ways, and one simple example will now be described with the aid of the accompanying drawing, which is more or less diagrammatic, the apparatus employing oil as the pressure medium and employing an accumulator to which oil is delivered at a predetermined pressure by pumps to provide a constant supply as is usual in the case of brakes which are applied by falling weights.

The brake 1 is of usual construction operated to the "on" position by depressing the free end of the brake lever 2 mounted on the brake operating shaft 3, and to the "off" position by raising the free end of the brake lever 2.

Underneath the end of the brake lever 2, which is without weights, is located a brake cylinder 4, consisting of a closed cylinder in which works a piston 5, the piston rod 5a of which is extended upwards and is pivotally connected to the end of the brake lever 2. The brake cylinder 4 is double acting, that is there is an inlet 6 to the top and an inlet 7 to the bottom of the cylinder.

Adjacent the brake cylinder 4 is a control valve 8 of usual construction having an inlet 9 near one end, an exhaust outlet 10 near the other end, and a control outlet 11 connected by a pipe 12 to the bottom inlet 7 in the brake cylinder 4. The plunger 13 of the control valve 8 is operated by the action of the driver's operating lever to which it is mechanically connected in any suitable manner.

The accumulator 14 is connected by a pipe 15 to the top inlet 6 of the brake cylinder 4, and said pipe 15 is connected by a branch pipe 15a to the inlet 9 of the control valve 8, whereby the pressure supply from the accumulator 14 is applied through the pipe 15 to the top side of the piston 5, thereby applying a constant pressure in the direction of brakes "on" whenever pressure is available from the accumulator 14, and when the control valve 8 is operated by movement of the plunger 13 to admit pressure from the branch pipe 15a to the pipe 12 connecting the central outlet 11 of the control valve 8 to the bottom inlet 7 in the brake cylinder 4 the pressure is admitted to the underside of the brake actuating piston 5 to raise same and lift the brake lever 2 to take the brakes "off" by virtue of the larger area of piston available to overcome the constant pressure on the top side of the piston 5.

In order to guard against the remote possibility of the pressure medium leaking past the piston 5 when it is in the brakes "on" position which leakage may tend to take the brakes "off," the piston 5 of the brake cylinder 4 is connected by means of a mechanical follow-up 16 or compensating linkage with the plunger 13 of the control valve 8. By suitably proportioning this follow-up gear 16 the control valve 8 will be slightly open to exhaust from the brake cylinder 4 through the outlet 10 and exhaust pipe 17 when the driver's brake actuating lever 35 is in the brakes "on" position, permitting any leak past the piston 5 to escape freely.

It is essential that with any failure or loss of the pressure supply the brakes 1 must "fall to safety," i. e. they must be positively applied.

A convenient method consists in rockably mounting on the brake operating shaft 3 a safety lever 18 carrying weights 19 at the free end, said safety lever 18 being coupled by a slotted link 29 or similar device with the brake lever 2.

Above the safety lever 18 is located a closed cylinder 21 having a piston 22, the rod 22a of which depends and is pivotally connected to the safety lever 18. The accumulator 14 is connected by a pipe 23 to the cylinder 21 on the underside of the piston 22, and in this pipe 23 is fitted in a casing 24 a sliding safety valve 25 on a rod 26 connected to a piston 27 in a cylinder 28 of the casing 24 above the pipe 23, said valve rod 26 being provided with weights 29. A branch pipe 30 of smaller diameter than the main pipe 23 leads from the accumulator side of the valve casing 24 to the cylinder 28 under the piston 27. A by-pass pipe 31 is also connected from the pipe 23 on the accumulator side of the valve casing 24 to the pipe 23 on the other side of the valve casing 24, and in this by-pass pipe 31 is a non-return valve 32.

Should there be any tendency of the safety piston to drop when a sudden demand is made on the pressure supply by the very rapid application of the brake cylinder 4, then the pressure can be taken through the non-return valve 32 and by-pass pipe 31. The valve 25 in the pipe 23 prevents the safety cylinder piston 22 from responding to any demand on the pressure supply so long as the full pressure is available as the valve 25 is kept closed by the pressure supporting its piston 27 through the branch pipe 30. A fall below the predetermined pressure in this branch pipe 30 would permit the piston 27 of the valve 25 to drop under action of its weights 29 for the valve 25 to open to release the pressure in the safety cylinder 21 for the safety weights 19 to fall and rock the safety lever 18 downwards to press on the brake lever 2 and apply the brakes 1.

Whenever pressure is available the safety weights 19 and safety lever 18 are raised to the weights "off" position; when in this position, the slotted link 20 or similar device permits the brake lever 2 to be actuated freely in either direction, without restriction. Immediately the pressure falls below that required to support the weights 19, the weights 19 and safety-lever 18 will fall. Whether the brakes are in the "off" or "on" position they will be applied by the safety weight lever 18 pressing on the brake lever 2.

A "pressure failure" switch 33 is connected in the pressure pipe 15 leading from the accumulator 14 to the brake cylinder 4 so arranged that on pressure falling below the predetermined amount, the switch 33 would immediately operate the emergency mechanism, which is connected in any suitable manner to the control valve plunger 13 thereby opening the valve 8 the maximum amount to exhaust the brakes "off" side of the brake cylinder 4.

A valve can be inserted in the exhaust pipe 17 from the control valve 8 as is current practice, to control the rate of application of the brakes.

Emergency application of the brakes (other than failure of pressure) is brought about by the action of the operator, excessive speed of the rotating element, or winding drum overtravel, or starting up in the wrong direction. In all these instances, the brakes are applied without the operation of the safety weights 19, and as already described, the only occasion in which the safety weights 19 will operate is on the failure of the pressure supply.

The means adopted for the emergency operation of the conventional weight applied brakes in current practice can all be used in the system above described.

In the example described oil is used as the pressure medium admitted through the pipe 34 to the accumulator 14, but other pressure mediums, such as steam, compressed air or water, can be employed in which case the oil pumps and accumulator will be replaced by suitable mechanism to provide the necessary power supply.

What we claim as our invention is:

1. In a mechanism for actuating an element including means urging said element to one position, a fluid pressure actuated device for restraining said urging means and a fluid actuating mechanism having a cylinder, a piston reciprocably mounted in said cylinder, and a piston rod extending from one side of the piston through one end of the cylinder, a control system comprising a conduit for supplying fluid under pressure, means placing the end of the cylinder through which the piston rod extends in communication with said conduit, a valve casing having a control port communicating with the other end of said cylinder, an inlet port communicating with said conduit and an exhaust port, a valve element in said casing operable in one position to place the control and inlet ports in communication with each other and operable in another position to place the control and exhaust ports in communication with each other, a pipe extending between said conduit and restraining device, a valve in said pipe, loading means urging said pipe valve to open position, fluid pressure actuated means responsive to pressure in said conduit for closing the pipe valve, a by-pass duct about said pipe valve, and a check valve in said by pass.

2. In a mechanism for actuating an element including means urging said element to one position, a fluid pressure actuated device for restraining said urging means and a fluid actuating mechanism having a cylinder, a piston reciprocably mounted in said cylinder, and a piston rod extending from one side of the piston through one end of the cylinder, a control system comprising a conduit for supplying fluid under pressure, means placing the end of the cylinder through which the piston rod extends in communication with said conduit, a valve casing having a control port communicating with the other end of said cylinder, an inlet port communicating with said conduit and an exhause port, a valve element in said casing operable in one position to place the control and inlet ports in communication with each other and operable in another position to place the control and exhaust ports in communication with each other, means interconnecting the piston rod and valve element to shift the valve element to a position establishing limited communication between the control and exhaust ports of the valve casing when the piston is at the end remote from that through which the piston rod extends, to prevent leakage of fluid from the side of the piston containing the rod to the other effecting movement of the piston towards the end of the cylinder through which the rod extends, a pipe extending between said conduit and restraining device, a valve in said pipe, loading means urging said pipe valve to open position, fluid pressure actuated means responsive to pressure in said conduit for closing the pipe valve, a by-pass duct about said pipe valve, and a check valve in said by pass.

WILLIAM THOMAS BELL.
ARTHUR CROMPTON.

REFERENCES CITED

The following references are of record in the file of this patent:

UNITED STATES PATENTS

| Number | Name | Date |
| --- | --- | --- |
| 1,585,529 | Boving | May 18, 1926 |
| 1,698,604 | Moore | Jan. 8, 1929 |
| 2,490,941 | Bell et al. | Dec. 13, 1949 |

FOREIGN PATENTS

| Number | Country | Date |
| --- | --- | --- |
| 459,433 | Great Britain | Jan. 4, 1937 |
| 670,085 | France | Aug. 12, 1929 |
| 178,000 | Switzerland | June 30, 1935 |